United States Patent
Laigle et al.

(10) Patent No.: US 11,905,868 B2
(45) Date of Patent: Feb. 20, 2024

(54) REDUCE COLD START INTERNAL COMBUSTION ENGINE GASEOUS POLLUTANTS EMISSIONS USING ADSORBENTS IN A CARTRIDGE IN A BYPASS EXHAUST LINE

(71) Applicant: SAUDI ARABIAN OIL COMPANY, Dhahran (SA)

(72) Inventors: Emmanuel Laigle, Courbevoie (FR); Christophe Chaillou, Rueil-Malmaison (FR); Caroline Norsic, Rueil-Malmaison (FR); André Nicolle, Nanterre (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 37 days.

(21) Appl. No.: 17/644,884

(22) Filed: Dec. 17, 2021

(65) Prior Publication Data

US 2023/0193797 A1    Jun. 22, 2023

(51) Int. Cl.
*F01N 3/20* (2006.01)
*F01N 3/08* (2006.01)
(Continued)

(52) U.S. Cl.
CPC ........... *F01N 3/0878* (2013.01); *B01D 53/94* (2013.01); *F01N 3/2026* (2013.01);
(Continued)

(58) Field of Classification Search
CPC . F01N 3/0878; F01N 2410/12; F01N 2450/30
See application file for complete search history.

(56) References Cited

U.S. PATENT DOCUMENTS 2,942,932 A    6/1960  Elliott
6,212,885 B1 *  4/2001  Hirota .................... F01N 3/085
                                                        60/288
(Continued)

FOREIGN PATENT DOCUMENTS

CN     105221221 B    6/2017
CN     105952516 B    1/2019
(Continued)

OTHER PUBLICATIONS

Machine translation of DE-102020106911-A1, accessed Jul. 15, 2023. (Year: 2023).*

(Continued)

*Primary Examiner* — Jonathan R Matthias
(74) *Attorney, Agent, or Firm* — Osha Bergman Watanabe & Burton LLP

(57) ABSTRACT

A system that may include an exhaust gas source that provides exhaust gas pollutants, a primary catalytic converter coupled downstream of the exhaust gas source, and an adsorption unit, configured to adsorb exhaust gas pollutants. The adsorption unit may be coupled downstream of the exhaust gas source. A process that may include introducing exhaust gas comprising exhaust gas pollutants into a system that includes an adsorption unit, such that the exhaust gas may flow through the adsorption unit and the exhaust gas pollutants may be adsorbed into an adsorption media in the adsorption unit as adsorbed exhaust gas pollutants. A depleted exhaust gas may pass from the adsorption unit.

14 Claims, 4 Drawing Sheets

(51) Int. Cl.
    *B01D 53/94*         (2006.01)
    *F01N 3/28*         (2006.01)

(52) U.S. Cl.
    CPC ........ *F01N 3/2803* (2013.01); *F01N 2410/12* (2013.01); *F01N 2450/30* (2013.01)

(56) References Cited

U.S. PATENT DOCUMENTS

| | | | |
|---|---|---|---|
| 8,161,734 B2 | 4/2012 | Takeda et al. | |
| 2006/0096281 A1* | 5/2006 | Huang | F01N 3/035 60/287 |
| 2008/0289321 A1* | 11/2008 | Lu | F01N 3/0878 60/299 |
| 2010/0205939 A1* | 8/2010 | Sano | F01N 3/0835 123/703 |
| 2011/0179770 A1 | 7/2011 | Schmuck-Soldan | |
| 2012/0255279 A1* | 10/2012 | Atluri | F01N 3/027 60/299 |
| 2017/0226911 A1 | 8/2017 | Haas et al. | |
| 2020/0198970 A1* | 6/2020 | Müller-Hellwig | B01D 53/04 |

FOREIGN PATENT DOCUMENTS

| | | |
|---|---|---|
| DE | 4008789 A1 | 9/1991 |
| DE | 112008002856 T5 | 4/2011 |
| DE | 102010043327 A1 | 5/2012 |
| DE | 102020103897 A1 * | 8/2021 |
| DE | 102020106911 A1 * | 9/2021 |
| DE | 102020115714 A1 * | 12/2021 |
| EP | 0640381 A1 | 3/1995 |
| EP | 0588315 B1 | 11/1997 |
| WO | 2004071646 A2 | 8/2004 |

OTHER PUBLICATIONS

International Search Report and Written Opinion issued in the counterpart International Application No. PCT/US2022/053204, dated Apr. 3, 2023 (160 pages).

* cited by examiner

REDUCE COLD START INTERNAL COMBUSTION ENGINE GASEOUS POLLUTANTS EMISSIONS USING ADSORBENTS IN A CARTRIDGE IN A BYPASS EXHAUST LINE

BACKGROUND

During a combustion process that takes place in an internal combustion engine (ICE), carbon-based fossil fuels along with an oxygen source are used to create energy. The product of creating energy from the combustion process is the formation of carbon dioxide ($CO_2$) and water. The combustion process also may create other byproducts, such as exhaust gas pollutants, including, but not limited to, carbon monoxide (CO), nitrogen oxides ($NO_x$), sulfur oxides ($SO_x$), and unconsumed hydrocarbons.

To improve air quality and meet emissions regulations, ICE systems include exhaust components that may be utilized to mitigate or reduce the amount of exhaust gas pollutants as compared to a system with an open exhaust line. Such ICE system components may include, but are not limited to, catalytic converters, particulate filters, and systems to re-route a portion of the exhaust gas, including the pollutants, back into the engine for further combustion (for example, engine gas recirculation or EGR).

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect, one or more embodiments of the disclosure may relate to a system that comprises an exhaust gas source that provides exhaust gas pollutants. The system may also comprise a primary catalytic converter coupled downstream of the exhaust gas source. The system may also comprise an adsorption unit configured to adsorb exhaust gas pollutants that is coupled downstream of the exhaust gas source.

In another aspect, one or more embodiments of the disclosure may relate to a method that comprises introducing an exhaust gas comprising exhaust gas pollutants into a system that includes an adsorption unit. The exhaust gas flows through the adsorption unit and the exhaust gas pollutants are adsorbed into an adsorption media in the adsorption unit as adsorbed exhaust gas pollutants. A depleted exhaust gas passes from the adsorption unit.

Other aspects and advantages of the claimed subject matter will be apparent from the following description and the appended claims.

BRIEF DESCRIPTION OF DRAWINGS

This section describes specific embodiments in detail with reference to the accompanying figures. Where the figures include like elements between them, the elements are denoted by like reference numerals. They may be differentiated by letters appended to reference numerals. The use of the prime or "'" mark with a numeral indicates a like element in a different state of operation or condition than as previously referenced; however, other aspects remain the same.

DETAILED DESCRIPTION

Figure 1:
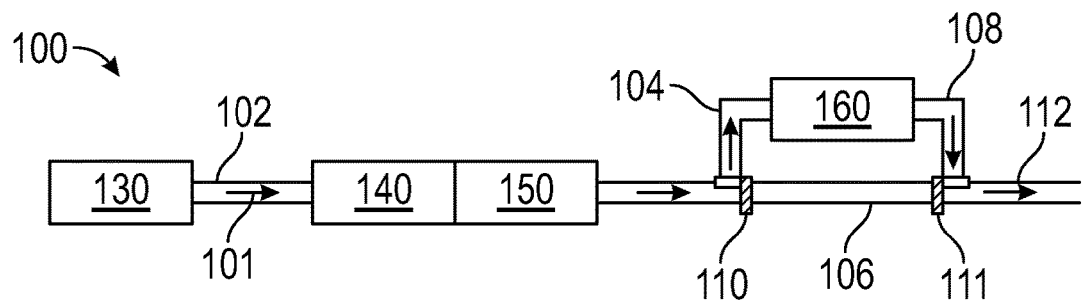
FIG. 1 shows a system in an activated state with an adsorption unit as well as an adsorption process, according to one or more embodiments.

One or more embodiments of the present disclosure relate to a system that includes an adsorbent in an adsorption unit, which may be positioned along a selectively accessible bypass line, which is located downstream of the primary catalytic converter. The bypass line is accessible through the exhaust piping and is downstream of and selectively fluidly coupled to the internal combustion engine (ICE).

The adsorption unit is configured to adsorb exhaust gas pollutants from exhaust gas producing a depleted exhaust gas. "Adsorption" is the process where an "adsorbate," meaning an atom, ion, molecule, charge, portion of a molecule, or substance adsorbs, collects, or adheres to an "adsorbent." The adsorbate is adsorbed into or onto the adsorbent. In one or more embodiments, adsorption may include absorption.

One or more embodiments of the present disclosure relate to a process that adsorbs exhaust gas pollutants in an adsorption unit located in a bypass line along the exhaust piping.

One or more embodiments of the present disclosure relate to a desorption process. In a desorption process, exhaust gas pollutants are desorbed from an adsorption unit located in a bypass line along the exhaust piping. The adsorbent (adsorption media or adsorbent media) is configured to both adsorb exhaust gas pollutants and desorb the exhaust gas pollutants. Exhaust gas pollutants may include, but are not limited to, CO, NOx, SOx, $NH_3$, hydrocarbon, aldehydes, and ketones.

The adsorbent may be a homogeneous substrate or a heterogeneous substrate (mixture of substrates). Examples of suitable adsorbents include, but are not limited to, activated carbons; zeolites, such as Cu-β, Cu-ZSM5, Fe-β, NH4-β, HY, 5A, or 13X; and metal organic frameworks, such as ZIF8. The adsorbent may be used in powder form, or it may be in monolith form (attached to a support), such as impregnated on a honeycomb shaped solid support. When a powder form adsorbent is used, the adsorbent has an increased storage capacity compared to an adsorbent impregnated on a honeycomb structure. When an adsorbent in monolith form is used, exhaust system backpressure may be limited compared to an adsorbent in powder form. In some instances, the substrate may be a synthetically modified adsorbent. A synthetically modified adsorbent may include, but is not limited to, a solid support, or an adsorbent further functionalized with an additional adsorbent.

Exhaust gas pollutants that are extracted from the exhaust gas may be stored in the adsorption unit under mild conditions. The adsorption of exhaust gas pollutants is conducted at mild conditions. "Mild conditions" include a temperature in a range of less than about 50° C., such as from about 0° C. to about 50° C. "Mild conditions" may include a pressure in a range of from about 1.3 bar to about 0.7 bar. The tailpipe may have a pressure of about 0.7 bar, and the exhaust just downstream of the catalytic converter may have a pressure of about 1.3 bar. The adsorbent may be stored in the mild condition pressure range at sea level and may be stored at mild condition pressure range adjusted for altitude when at higher altitude than sea level.

Desorption is conducted in a temperature greater than the mild conditions of adsorption, such as in a range of 50° C. or greater, such as from about 50 to 500° C. Desorption utilizes a heat source to facilitate desorption. The heat source is a heating element that may be positioned in the desorption unit, outside of the adsorption unit, coupled to the adsorption unit, or upstream of the adsorbent. When the heating element is upstream of the adsorbent, the exhaust gas pollutant temperature may be homogenous and may lead to a homogenous desorption, as compared to a "hot spot" adsorption if the heating element is at a location in the adsorbent. A suitable type of heating element may include an electric heater or a heat exchanger. The type of heating element is not particularly limited so long as the heating element does not include an ignition source, such as a burner or spark. Heating elements with an ignition source may increase fuel consumption and may emit additional pollutants.

The adsorption unit may be a fixed or a modular unit. When the adsorption unit is modular, the unit may be uncoupled, removed, and replaced with the same or another adsorption unit, similar to a cartridge unit. An adsorption unit may be configured to indicate its level of saturation, such as saturation with exhaust gas pollutants in one or more embodiments.

Internal Combustion Engine

Regardless of the efficiency of the engine and the fuel ratio, when an engine is consuming a fuel, the fuel combusts and produces exhaust gas. With exhaust gas production comes some amount inefficient combustion, and therefore exhaust gas pollutants.

An "internal combustion engine" or "engine" is any type of motor using a fuel combustion process. The engine may be a spark engine or a compression engine. Types of engine include, but are not limited to, a heavy fuel oil (HFO) engine, a Diesel engine, a generator, a gasoline engine, a two stroke, a four stroke, or a six stroke engine. One skilled in the art would appreciate the vast array of internal combustion engines covered by this definition.

Pollutants—incomplete or by product reaction products— can be found in the exhaust gas of an ICE.

An internal combustion engine may operate at a range of temperatures. An engine operating temperature range of a given engine is any suitable engine operating temperature for combusting fuel to create power, such as in a range of from about 50° C. to about 1,500° C. As a non-limiting example, combustion engines may operate at the lower end of the temperature operating range and reaction engines may operate at the higher end of the temperature operating range.

An internal combustion engine operates at a range of pressures. In a non-limiting example, an ICE cylinder pressure may have a range of from about 600 pounds per square inch (psi) to about 2000 psi.

The exhaust gas passing from an internal combustion engine may pass at an elevated temperature. Non-limiting examples of an elevated temperature include a diesel fuel burning engine having an exhaust temperature in a range of from about 100° C. to about 700° C., and a gasoline fuel burning engine having an exhaust temperature in a range of from about 300° C. to about 950° C.

The exhaust gas passing from an internal combustion engine may pass at an elevated pressure. The exhaust pressure is greatest immediately after the exhaust gas passes from the combustion area and generally decreases in pressure as the exhaust gas passes through the exhaust piping. A gasoline fuel-burning engine may have an exhaust pressure in a range of from, for example, about 50 kilopascals (kPa) to about 600 kPa.

In one or more embodiments, when the engine is cold or malfunctioning, there is not enough heat from the exhaust to bring the catalyst in the catalytic converter to the operating temperature. Thus, one or more embodiments of the system or process may be used to adsorb, store, or recycle exhaust gas pollutants from the engine exhaust gas when the catalyst in the catalytic converter is not operating at catalyst operating temperature. When in conjunction with a gasoline engine, a catalytic converter operating temperature range may be greater than about 400° C. When used in conjunction with a diesel engine, a catalytic converter operating temperature range may be greater than about 200° C.

System

Provided is a system for adsorption of exhaust gas pollutants from exhaust gas. The system may be any one of an activated, a free-flow, or a desorption state of operation. An "activated" state means that exhaust gas, which includes, for example, pollutants, is routed through the adsorption unit in the system. A "free-flow" state means that the exhaust gas bypasses the adsorption unit and is discharged from the system without adsorption treatment. A "desorption" state means that the desorption unit passes desorbed exhaust gas pollutants back into the engine exhaust gas stream.

In one or more embodiments, a recycle stream that includes desorbed exhaust gas pollutants from an adsorption unit may be provided to the system. The recycle stream is passed from the adsorption unit when the system is in a desorption state of operation. The recycle stream (desorbed exhaust gas pollutants) may be routed upstream of a primary catalytic converter, where the desorbed exhaust gas pollutants are combined with system exhaust gas and are routed to the primary catalytic converter. Alternatively, the recycle stream may be routed to a tailpipe, upstream of a secondary catalytic converter, where they are processed.

The system includes an exhaust gas source that provides exhaust gas pollutants, such as those that may be provided by an internal combustion engine. The system includes a catalytic converter, an adsorption unit, and exhaust valves. Optionally, the system includes a particulate filter, exhaust piping, a secondary catalytic converter, or a combination thereof.

The catalyst of the catalytic converter may be a honeycomb substrate structure with open channels to allow exhaust gas flow to flow though the catalyst. The catalytic converter surrounds the catalyst with a housing. The substrate (or monolith) supporting the active phase of the catalytic converter may be of cordierite or metal. A wash coat on the substrate increases the surface contact with exhaust gas. A metal (catalyst) in the wash coat accelerates a chemical reaction to mitigate exhaust gas pollutants. The conversion efficiency of the catalyst (catalytic converter) is a function of temperature. When the temperature is too low, such as during cold startup (cold-start conditions), engine malfunction, or cold engine temperatures, the catalyst may be inactive. A catalyst light-off scenario is when the temperature is too low, and the catalyst is inactive. The "catalyst light-off" temperature is in a range of from about 150 to 300° C., or where the catalytic activity of the catalyst in the catalytic converter is less than 50%. In one or more embodiments, when catalyst light-off is achieved, the system is considered "activated". At such moments, the system could be transitioned from sending exhaust gas through the adsorption unit to passing exhaust gas from the system. When utilized in conjunction with a gasoline engine, a catalytic converter light-off temperature may be in a range of from about 250° C. to about 300° C. When used in conjunction with a diesel engine, a catalytic converter light-off temperature may be in a range of from about 150° C. to about 250° C.

The system may include one or more catalytic converters. When the system includes one catalytic converter, it may be called a primary catalytic converter or catalytic converter. When the system includes two or more catalytic converters, the upstream-most catalytic converter is called a primary catalytic converter, and the one or more downstream catalytic converters may be a secondary catalytic converter. Two or more secondary catalytic converters may include a first secondary catalytic converter, a second secondary catalytic converter, a third secondary catalytic converter, and so on, in series, to try to chemically eliminate exhaust gas pollutants.

The particulate filter may be in fluid communication with the catalytic converter. The particulate filter in one or more embodiments may be coupled to the catalytic converter. In one or more embodiments, the particulate filter may be included within the catalytic converter housing.

The particulate filter is configured to collect soot, hydrocarbon, and other particulate matter. The particulate size that is trapped by the particulate filter is from nano- to micro-size, such as from about 5 nanometers (nm) to about 1000 nm.

The particulate filter may have a filtration efficiency such as may provide the lowest tailpipe emissions compared to emissions regulations. If the emissions regulations are not as stringent as those requiring a particulate filter, the particulate filter may be optional.

As mentioned, the adsorption unit is configured to adsorb exhaust gas pollutants from exhaust gas. The system may include two or more adsorption units. When the system includes two or more adsorption units, the upstream-most adsorption unit is called a primary adsorption unit, and the one or more downstream adsorption unit may be a secondary adsorption unit. Two or more secondary adsorption units may include a first secondary adsorption unit, a second secondary adsorption unit, a third secondary adsorption unit, and so on, in series. The exhaust valves may be one-way or two-way. In either case, the exhaust valves are uni-directional. "Uni-directional" means that exhaust gas flows in a single direction; back-flow is not allowed. A check or butterfly valve performs a similar function and are included.

When a one-way exhaust valve is in an open state, as an open one-way exhaust valve, it allows flow through the valve in a single direction either upstream or downstream. When a one-way exhaust valve is in a closed state, as a closed one-way exhaust valve, the valve blocks flow through the valve from either direction.

In one or more embodiments, in a system configuration where a two-way exhaust valve is in an open state, as an open one-way exhaust valve, the valve may selectively permit flow to or from an adsorption unit according to the valve position within the system, such as in a system adsorption state. In some configurations, other valves within the system (such as the one-way valves) may be configured to selectively permit flow from an adsorption unit while the two-way valves are closed, such as during a system desorption state. In one or more embodiments, in a system configuration where the two-way exhaust valve is in a close state, as a closed two-way exhaust valve, the two-way exhaust valve selectively prohibits flow to or from an adsorption unit according to the valve position within the system, such as during a system free-flow state. The type of exhaust valves is not particularly limited and may include electronic, hydraulic, mechanical, vacuum, manual, or a combination of exhaust valve types.

The exhaust piping is not particularly limited and may be sized to the engine and the exhaust flow of the system and the internal combustion engine. The exhaust piping may include flow conduits, such as a bend, a flexible section, a resonator, a muffler, a cooler, or a combination thereof. The diameter of the exhaust piping may be in a size range of from about 1 centimeter (cm) to about 8 cm, or other suitable exhaust piping size for the application. The exhaust piping material is not particularly limited, an example material being stainless steel.

Sensors may be included for determining activation and deactivation parameters. These sensors may include a sensor for detecting a catalyst condition, such as an $O_2$ sensor or catalyst temperature sensor; an engine, exhaust, or exhaust gas temperature sensor; a catalyst volumetric flow sensor, such as an $O_2$ sensor in conjunction with a mass air pressure sensor or a mass airflow sensor; and a sensor to measure time duration since engine startup. One of ordinary skill in the art would appreciate the types of sensors and their mounting locations to monitor the catalytic converter, exhaust gas, and volumetric flow through an embodiment of a system.

The sensors may be in signal communication with a computer, such as an engine control module. Electronic communication from a sensor to the computer acts as a data signal that provides information about a detected condition or state. The computer may include an algorithm that uses the data signal to determine when the catalytic converter is within an appropriate operating temperature to process exhaust gas pollutants. The computer, in response to the determined condition by the algorithm, may send a signal to one or more exhaust valves as an output command to change state, such as position from open to closed. For example, the output signal from the computer may either result in activating or deactivating the system. One or more embodiments of the system may remain activated until the computer communicates an output signal to deactivate the system. In one or more embodiments, the computer may send a signal to an operator, provoking a manual response activation or deactivation by the operator. In one or more embodiments, the computer may not receive a signal to activate or deactivate the system; rather, the computer may be configured such that it is operating by a programmed time-delay with no response to inputs.

The system may be switched between three configurations. An activated state configuration is where the adsorption unit is activated. A free-flow state configuration is where the adsorption unit is deactivated. A desorption state configuration is where the desorption occurs.

FIG. 1 shows a system 100 of one or more embodiments in an activated state, which
 includes an exhaust gas source 130 coupled to a downpipe 102, where the downpipe is coupled to a catalytic converter 140, the catalytic converter is coupled to a particulate filter 150, the particulate filter is coupled to a midpipe. The midpipe includes an adsorption unit feed pipe 104 and a free-flow pipe 106. The adsorption unit feed pipe 104 is coupled to an adsorption unit 160, and the adsorption unit 160 is coupled to an adsorption unit exit pipe 108 and a tailpipe 112. The free-flow pipe 106 is also coupled to the tailpipe 112. The system 100 further includes two-way exhaust valve 110, coupling the adsorption unit feed pipe 104 and the free-flow pipe 106 and selectively regulating flow. The two-way exhaust valve 111, coupling the free-flow pipe 106 and the tailpipe 112 and selectively regulating the flow. FIG. 1 shows the direction of exhaust gas flow 101 with arrows in system 100.

In the activated state shown in FIG. 1, the two-way exhaust valves 110, 111 are open and the adsorption unit 160 is in selective fluid communication with an exhaust gas source 130 that provides exhaust gas pollutants, such as from an ICE. Thus, the system 100 in the activated state is configured to allow exhaust gas flow 101 into the adsorption unit 160.

Figure 2:
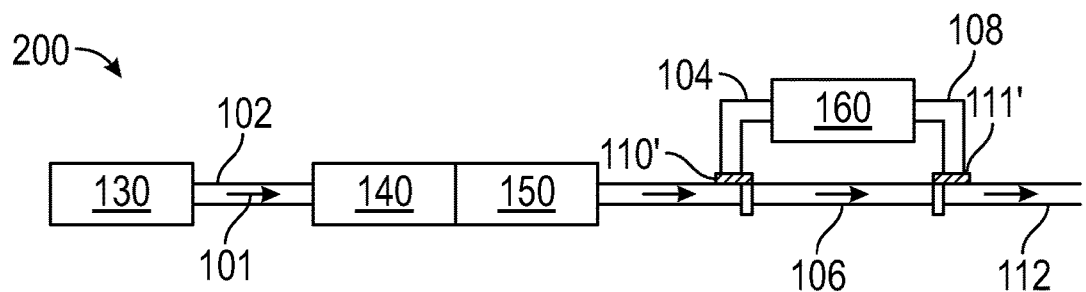
FIG. 2 shows a system in a free-flow state with an adsorption unit as well as a deactivation process, according to one or more embodiments.

FIG. 2 shows a system 200 of one or more embodiments in a free-flow state, where the adsorption unit 160 is bypassed. In the free-flow state, the two-way exhaust valves 110', 111' are closed and the adsorption unit 160 is selectively fluidly isolated from the exhaust gas flow. Thus, the system 200 in a free-flow state is configured to allow exhaust gas flow through the free-flow pipe 106 and is not configured to allow exhaust gas flow into the adsorption unit 160. Such an operating state may be utilized when the catalytic converter 140 is at operating temperature.

Figure 3:
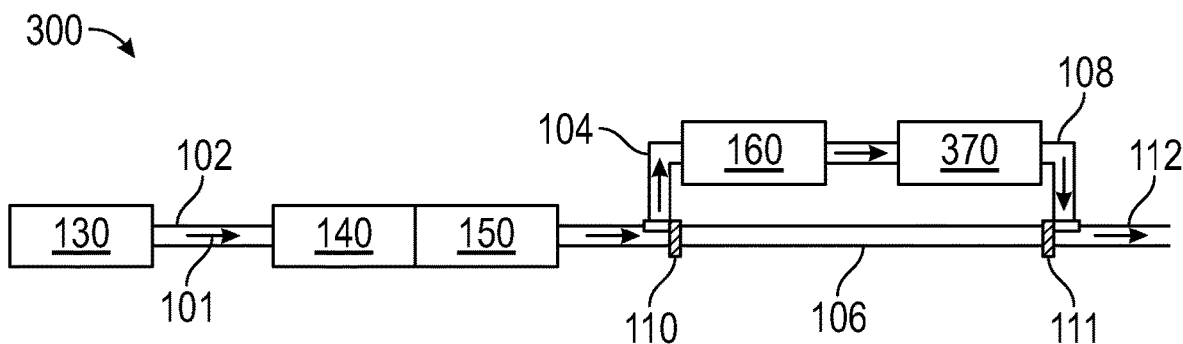
FIG. 3 shows a system in an activated state with multiple adsorption units as well as an adsorption process, according to one or more embodiments.

In one or more embodiments, multiple adsorption units may be included in the system. For example, FIG. 3 shows a system 300 of one or more embodiments in an activated state that includes an adsorption unit 160 that is a primary adsorption unit, and a secondary adsorption unit 370. Where multiple adsorption units are included, the adsorption units may be coupled in series. In the activated state, the two-way exhaust valves 110, 111 are open and the adsorption unit 160 that is a primary adsorption unit, as well as the secondary adsorption unit 370 are in selective fluid communication with an exhaust gas source 130. Exhaust gas pollutants are adsorbed by the adsorption unit 160 and secondary adsorption unit 370.

Figure 4:
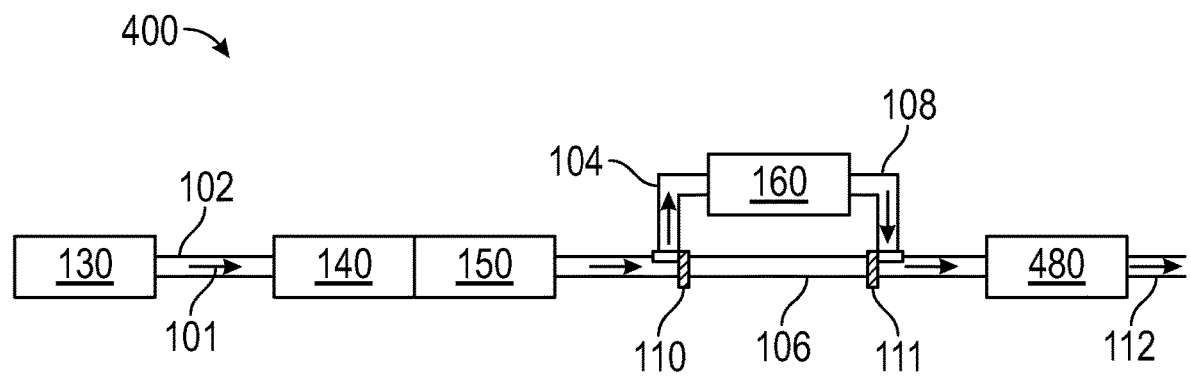
FIG. 4 shows a system in an activated state with multiple catalytic converters as well as an adsorption process, according to one or more embodiments.

In one or more embodiments, multiple catalytic converters are included in the system. For example, FIG. 4 shows a system 400 of one or more embodiments in an activated state that includes a catalytic converter 140 that is a primary catalytic converter, and a secondary catalytic converter 480. Where multiple catalytic converters are included, the primary catalytic converter may be at a position directly downstream of the exhaust gas source 130 that provides exhaust gas pollutants, and the secondary catalytic converter may be at a position downstream of the primary catalytic converter. FIG. 4 shows the secondary catalytic converter 480 positioned along the exhaust piping in-line of the tailpipe 112.

Figure 5:
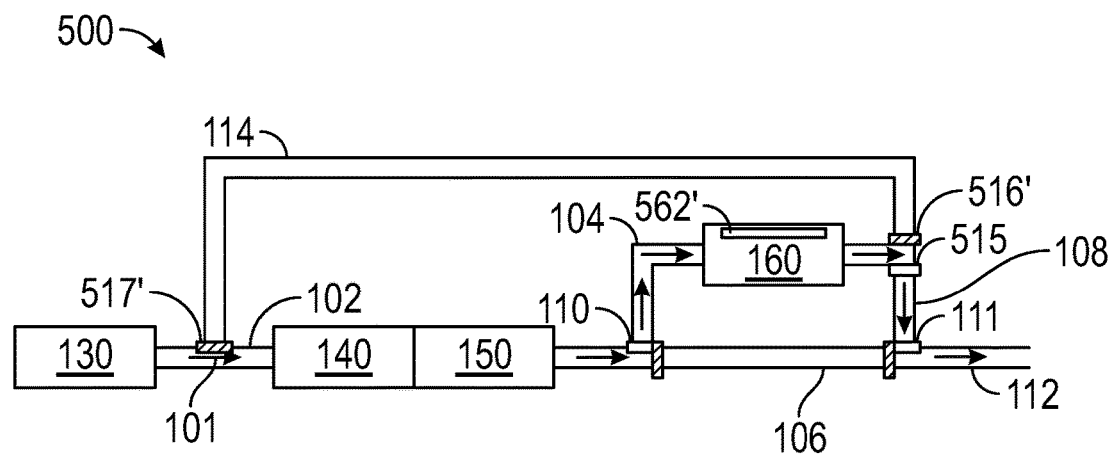
FIG. 5 shows a system in an activated state with an adsorption unit as well as an adsorption process, according to one or more embodiments.
Figure 6:
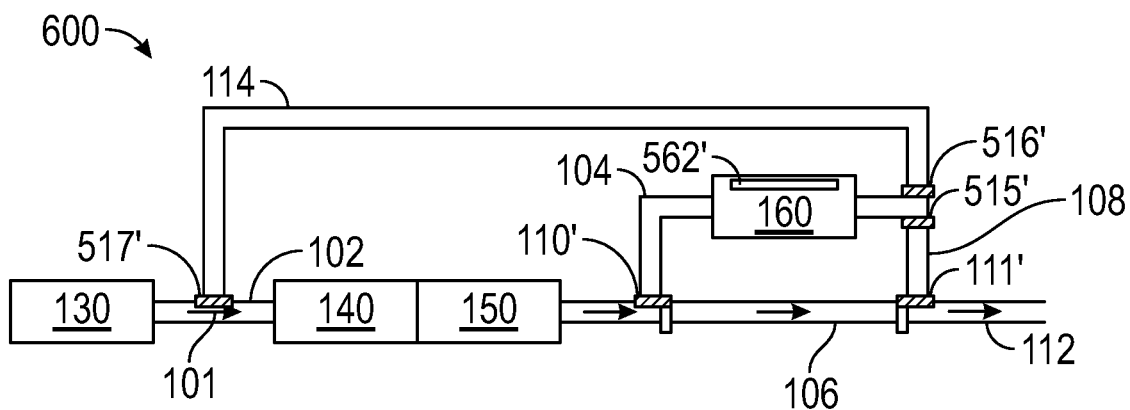
FIG. 6 shows a system in a free-flow state with an adsorption unit as well as a deactivation process, according to one or more embodiments.
Figure 7:
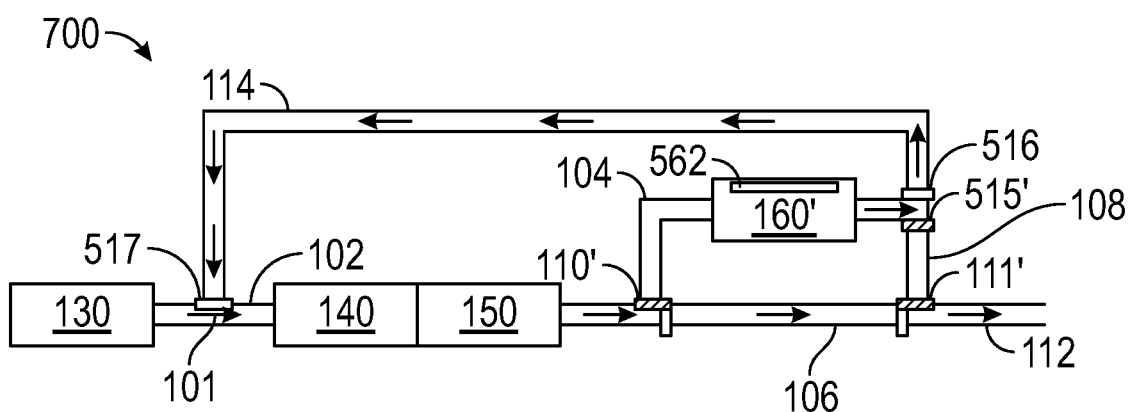
FIG. 7 shows a system in a desorption state with an adsorption unit as well as a desorption process, according to one or more embodiments.

In one or more embodiments, the system may include a recycle stream. Such a system (as shown in FIGS. 5, 6, and 7) includes a heating element 562 coupled to or inside the adsorption unit, a desorption pipe 114 coupled to the adsorption unit exit pipe 108 and the downpipe 102, and one-way exhaust valves 515, 516, 517. One-way exhaust valves include exit valve 515, which is directed in a downstream direction from the adsorption unit 160. One-way exhaust valves include desorption valves 516 and 517. When heated by the heating element 562, the adsorption unit is noted as adsorption unit 160' (indicating heating).

FIG. 5 shows a system 500 of one or more embodiments in an adsorbing exhaust gas pollutants state. In this activated state, the two-way exhaust valves 110, 111 are open, the exit valve 515 is open, and the desorption valves 516', 517' are closed. The system 500 is configured such that exhaust gas passes through the adsorption unit 160 into the exhaust piping and into the tailpipe, but exhaust gas pollutants are adsorbed (captured) in the adsorption unit 160. The heating element 562' is off.

FIG. 6 shows a system 600 of one or more embodiments in a free-flow state. In this configuration, the two-way valves 110', 111' are closed, the exit valve 515' is closed, and the desorption valve 516', and the desorption valve 517' are closed. The system 600 is configured such that the adsorption unit 160 is isolated from exhaust gas flow.

FIG. 7 shows a system of one or more embodiments in a desorption state. In the desorption state, the two-way valves 110', 111' are closed, the exit valve 515' is closed, and the desorption valves 516 and 517 are open to the adsorption unit and are directing desorbed engine gas pollutants a downstream direction from the adsorption unit 160'. The heating element 562 is in an active state (turned on) heating the adsorption unit 160', thereby facilitating initiating desorption of the adsorbate exhaust gas pollutants from the adsorbent. The system 700 is selectively configured to pass exhaust gas pollutants through the desorption pipe 114 as a recycle stream to the catalytic converter 140, which is the primary catalytic converter. The recycle stream of desorbed exhaust gas pollutants is passed back into the exhaust piping upstream of the catalytic converter 140 for conversion and eventual expulsion.

Figure 8:
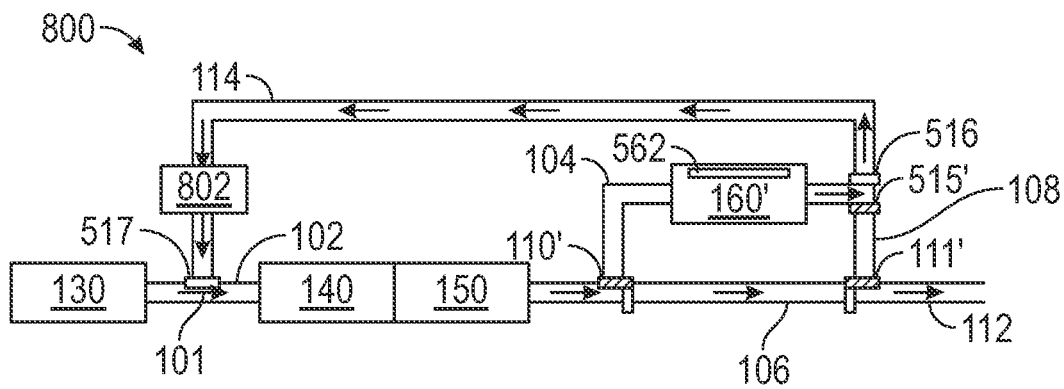
FIG. 8 shows the system of FIG. 7 with the optional pressure unit, according to one or more embodiments.

FIG. 8 shows the system of FIG. 7 with the optional pressure unit. In one or more embodiments, the pressure of the recycle stream of desorbed exhaust gas pollutants and the pressure of the exhaust gas in the exhaust piping 101 upstream of the catalytic converter 140 are approximately equal. These gases of approximately equal pressures enter the exhaust piping 101 upstream of the catalytic converter, intermingle, and pass to the catalytic converter 140. In one or more embodiments, a pressure unit 802 may be included in the recycle stream (such as coupled to a desorption pipe 114) to provide gas compression and to equalize the pressure of the exhaust gas pollutants in the recycle stream with the exhaust gas in the exhaust piping 101 upstream of the catalytic converter 140. Such a pressure unit 802 may include, but is not limited to, a turbo, an electric turbo, a compressor, a fan, or a compressed gas.

Process

Figure 9:
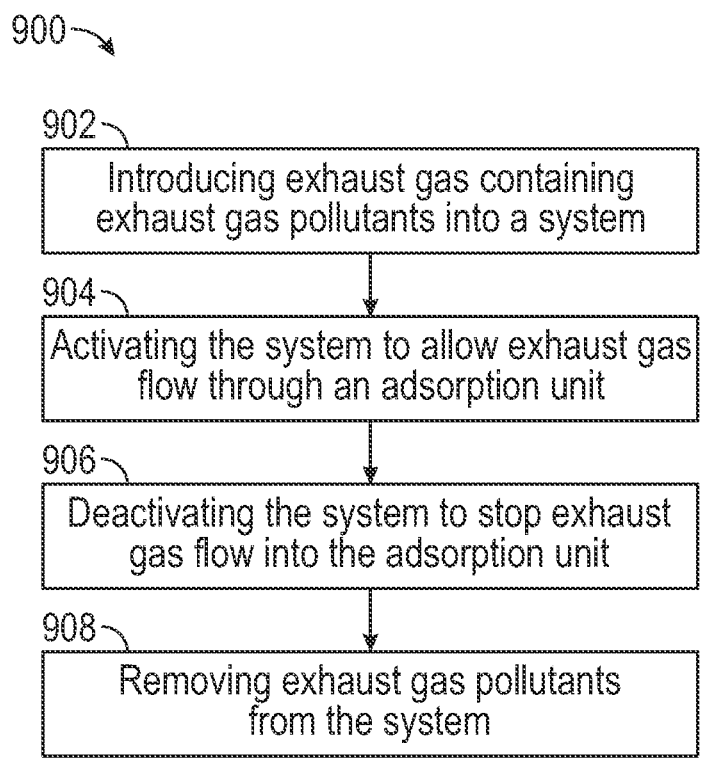
FIG. 9 shows a process for collecting exhaust gas pollutants.

FIG. 9 shows an embodiment process for collecting exhaust gas pollutants. As a step, the process 900 shown in FIG. 9 may include introducing exhaust gas that contains exhaust gas pollutants into a system 902. The process 900 may include activating the system to allow exhaust gas to selectively flow through an adsorption unit in the system 904, thereby capturing and storing exhaust gas pollutants. The process may include deactivating the system to stop exhaust gas flow into the adsorption unit 906, thereby ceasing the introducing of exhaust gas into the adsorption unit. The process may include removing exhaust gas pollutants from the system 908.

In one or more embodiments, the process may include introducing exhaust gas containing exhaust gas pollutants into a system 902 including an adsorption unit. The exhaust gas source that provides exhaust gas pollutants may be from an ICE. Introducing exhaust gas may occurs during a cold-start condition, an engine malfunction, or at cold engine temperatures. In one or more embodiments, introduction may occur during normal operation of the internal combustion engine.

"Cold engine temperatures" for a liquid-cooled engine is defined by having an engine coolant temperature that has not reached its regulation target, such as a coolant temperature less than about 80° C., such as less than about 75° C., or such as less than about 70° C. "Cold engine temperatures" for an air-cooled engine is defined by having an engine temperature that has not reached its regulation target. Depending on the air-cooled engine operating temperature and its regulation target, cold engine temperatures may be defined by a cylinder head temperature less than about 150° C., such as less than about 140° C., such as less than about 130° C., such as less than about 120° C., or such as less than about 110° C. Cold engine temperatures for a liquid-cooled or an air-cooled engine may also be expressed as an oil temperature less than about 100° C., such as less than about 90° C., less than about 80° C., less than about 75° C., or less than about 70° C.

A "cold-start condition" is defined by two conditions: the engine has cold engine temperatures, and the catalyst in the catalytic converter is less than the light-off temperature. Under a cold-start condition, the engine emits more pollutants than the same engine operating at a normal operating temperature, when the catalytic converter is at operating temperature, or both. In addition, an engine may operate under a start-up "combustion mode" to warm the engine or reach catalytic converter operating temperature quickly during a cold-start condition. This start-up combustion mode may further increase the pollutants emitted by the engine as compared to normal operation.

In one or more embodiments, the process includes activating the system by opening the exhaust valves within the system such that exhaust gas flows through to the adsorption unit. The exhaust gas intermingles with the adsorbent, which causes exhaust gas pollutants to adsorb onto the adsorbent within the adsorption unit. The depleted exhaust gas, which is free of the exhaust gas pollutants, flows out of the adsorption unit and passes from the system.

The exhaust gas pollutants adsorbed (captured) by the adsorbate may be maintained within the adsorption unit during and after the adsorption process. For example, the process may include maintaining the adsorbed exhaust gas pollutants in the adsorption unit. As the engine and exhaust warms during operation, the catalyst within the catalytic converter is brought to operating temperature in a range of from about 150-300° C., depending on the catalyst used—where "kick-off" occurs.

When the catalyst inside of the catalytic converter is detected to be at an operating temperature, a sensor signal is sent from a sensor associated with the catalytic converter to a control unit, such as a computer controller or to an operator via a computerized monitoring system. The signal may indicate that the adsorption process may be deactivated.

In one or more embodiments, the process includes deactivating the system. In a deactivation process, deactivating the system includes selectively halting exhaust gas flow into the adsorption unit 906. Deactivation may include closing the two-way exhaust valves within the system, such that exhaust gas flows around the adsorption unit rather than through it. Deactivation may be initiated by sending a signal from a control unit or an operator via a computer to the two-way exhaust valves.

In one or more embodiments, the process may include storing the exhaust gas pollutants in the adsorbent within the system. Storage is initiated upon introducing exhaust gas pollutants into the adsorption unit when the system is in an activated state. Storage may continue when the system is in a deactivated state until exhaust gas pollutants are removed. Upon deactivation, stored exhaust gas pollutants are maintained in the adsorption unit.

In one or more embodiments, the process includes removing the exhaust gas pollutants from the system 908. In one or more embodiments, the exhaust gas pollutants may be removed from the system by physically removing the adsorption unit from the system. When the adsorption unit is modular, the adsorption unit may be removed manually, similar to a cartridge. In this way, the stored adsorbate may be collected and moved out of the system for further processing.

The amount of stored adsorbate in the adsorbent may be in a concentration range of from about 1 milligram (mg) adsorbate per gram of adsorbent to about 300 mg/g (adsorbate to adsorbent). The amount of stored adsorbate may depend on factors including, but not limited to, the type of adsorbent, the adsorbent form (powder or monolith), age of adsorbent, competitive adsorption among exhaust gas pollutants, and partial pressures of the exhaust gas pollutants. The volume of adsorbent within an adsorption unit varies, depending on the targeted efficiency and period between adsorption and removing exhaust gas pollutants.

In one or more embodiments, the process of removing the exhaust gas pollutants from the system may include activating desorption by introducing heat from a heating element into the adsorption unit. For example, an adsorption unit heating element may be located in the adsorption unit. The heating element may be activated such that heat is produced and transmitted such that a temperature in a range of from about 50 to about 500° C. is achieved in the adsorbent material. Once the adsorbent is heated, chemical and physical forces that hold the exhaust gas pollutant adsorbate onto the adsorbent are overcome. The released exhaust gas pollutants are passed from the adsorption unit as a gas. Desorption may occur in a system with a fixed (that is, not removable from system) or a modular adsorption unit (that is, removable from system). After such a thermal treatment, the adsorbent depleted of exhaust gas pollutants may be ready for use as "fresh" adsorbent once again.

In one or more embodiments, the desorbed exhaust gas pollutants pass from the adsorption unit into the exhaust piping. The location of re-entry of the exhaust gas pollutants into the exhaust gas piping may be in one or more embodiments upstream of a catalytic converter. Such a system configuration may permit further processing while the catalytic converter is at operating temperature. The re-entry point may be in one or more embodiments in a downpipe section between an exhaust gas source, such as from an ICE, and a catalytic converter. In one or more embodiments, the re-entry point may be in a tailpipe section downstream of a primary catalytic converter and upstream of a secondary catalytic converter. After processing in the catalytic converter, the desorbed and processed exhaust gas pollutants are passed from the system.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A system, comprising:
   an exhaust gas source that provides exhaust gas pollutants;
   a primary catalytic converter coupled downstream of the exhaust gas source;
   a particulate filter coupled downstream of the primary catalytic converter;
   a first adsorption unit, configured to adsorb exhaust gas pollutants, coupled downstream of the particulate filter, and
   a second adsorption unit, configured to adsorb exhaust gas pollutants, coupled downstream of the first adsorption unit,
   wherein the first and second adsorption units include one or more heating elements, and
   wherein the exhaust gas pollutants are selected from the group consisting of CO, $SO_x$, $NH_3$, aldehydes, ketones, and combinations thereof.

2. The system of claim 1, configured to selectively permit exhaust gas flow into the first and second adsorption units.

3. The system of claim 1, configured to selectively not permit exhaust gas flow into the first and second adsorption units.

4. The system of claim 1, where the system is configured to selectively pass a recycle stream of the exhaust gas pollutants from the first and second adsorption units.

5. The system of claim 4, where the system further comprises a pressure unit in the recycle stream.

6. The system of claim 1, where the system is configured with three or more adsorption units coupled in series.

7. The system of claim 1, where the system further comprises a secondary catalytic converter coupled downstream of the primary catalytic converter.

8. A process, comprising:
   introducing exhaust gas comprising exhaust gas pollutants into a system that includes a particulate filter located upstream of and a first adsorption unit and second adsorption unit with heating elements, such that the exhaust gas flows through the first and second adsorption units and the exhaust gas pollutants are adsorbed into an adsorption media in the first and second adsorption units as adsorbed exhaust gas pollutants, and a depleted exhaust gas passes from the first and second adsorption units; wherein the exhaust gas pollutants are selected from the group consisting of CO, $SO_x$, $NH_3$, aldehydes, ketones, and combinations thereof.

9. The process of claim 8, further comprising:
   ceasing of introducing the exhaust gas into the first and second adsorption units and passing the exhaust gas from the system, and
   maintaining the adsorbed exhaust gas pollutants in the first and second adsorption units.

10. The process of claim 8, further comprising:
    removing the adsorbed exhaust gas pollutants from the system.

11. The process of claim 10, further comprising activating desorption by introducing heat from the heating elements to the first and second adsorption units, where desorbed exhaust gas pollutants pass from the first and second adsorption units.

12. The process of claim 11, where the desorbed exhaust gas pollutants are received in exhaust gas piping upstream of a primary catalytic converter and downstream of an exhaust gas source.

13. The process of claim 11, where the desorbed exhaust gas pollutants are received in exhaust gas piping downstream of the primary catalytic converter and upstream of a secondary catalytic converter.

14. The process of claim 10, further comprising removing the first and second adsorption units from the system.

* * * * *